United States Patent
Takada

(12) 
(10) Patent No.: US 7,812,564 B2
(45) Date of Patent: Oct. 12, 2010

(54) BLOWER AND ELECTRIC DEVICE WITH SUCH BLOWER MOUNTED THEREON

(75) Inventor: Masayuki Takada, Aichi (JP)

(73) Assignee: Panasonic Corporation, Osaka (JP)

( * ) Notice: Subject to any disclaimer, the term of this patent is extended or adjusted under 35 U.S.C. 154(b) by 308 days.

(21) Appl. No.: 11/997,452

(22) PCT Filed: Sep. 29, 2006

(86) PCT No.: PCT/JP2006/319468

§ 371 (c)(1),
(2), (4) Date: Jan. 31, 2008

(87) PCT Pub. No.: WO2007/040180

PCT Pub. Date: Apr. 12, 2007

(65) Prior Publication Data

US 2009/0129017 A1    May 21, 2009

(30) Foreign Application Priority Data

Oct. 4, 2005  (JP) .............................. 2005-290961

(51) Int. Cl.
  *H02P 23/00* (2006.01)
(52) U.S. Cl. .................. 318/811; 318/400.01; 318/268
(58) Field of Classification Search ............. 318/811, 318/400.01, 268, 783, 471, 472, 473; 361/695; 416/61

See application file for complete search history.

(56) References Cited

U.S. PATENT DOCUMENTS

2006/0208686 A1    9/2006    Takada

FOREIGN PATENT DOCUMENTS

| JP | 08-140390 A | 5/1996 |
|---|---|---|
| JP | 10-089674 | 4/1998 |
| JP | 2001-193688 A | 7/2001 |
| JP | 2002-165477 A | 6/2002 |
| JP | 2003-254287 A | 9/2003 |
| JP | 2004-180476 A | 6/2004 |
| JP | 2005-204398 A | 7/2005 |
| JP | 2005-261198 A | 9/2005 |

OTHER PUBLICATIONS

International Search Report for International Application No. PCT/JP2006/319468 dated Dec. 26, 2006.
Japanese Office Action for Application No. 2005-290961, Apr. 28, 2010, Panasonic Corporation.

*Primary Examiner*—Karen Masih
(74) *Attorney, Agent, or Firm*—RatnerPrestia

(57) ABSTRACT

A supply current control circuit controls the voltage of a low-voltage direct-current power source so that the average current of an inverter circuit detected by a current detecting circuit becomes constant at a specified current value. Accordingly, characteristics that are little in the amount of change of air volume are obtained.

8 Claims, 8 Drawing Sheets

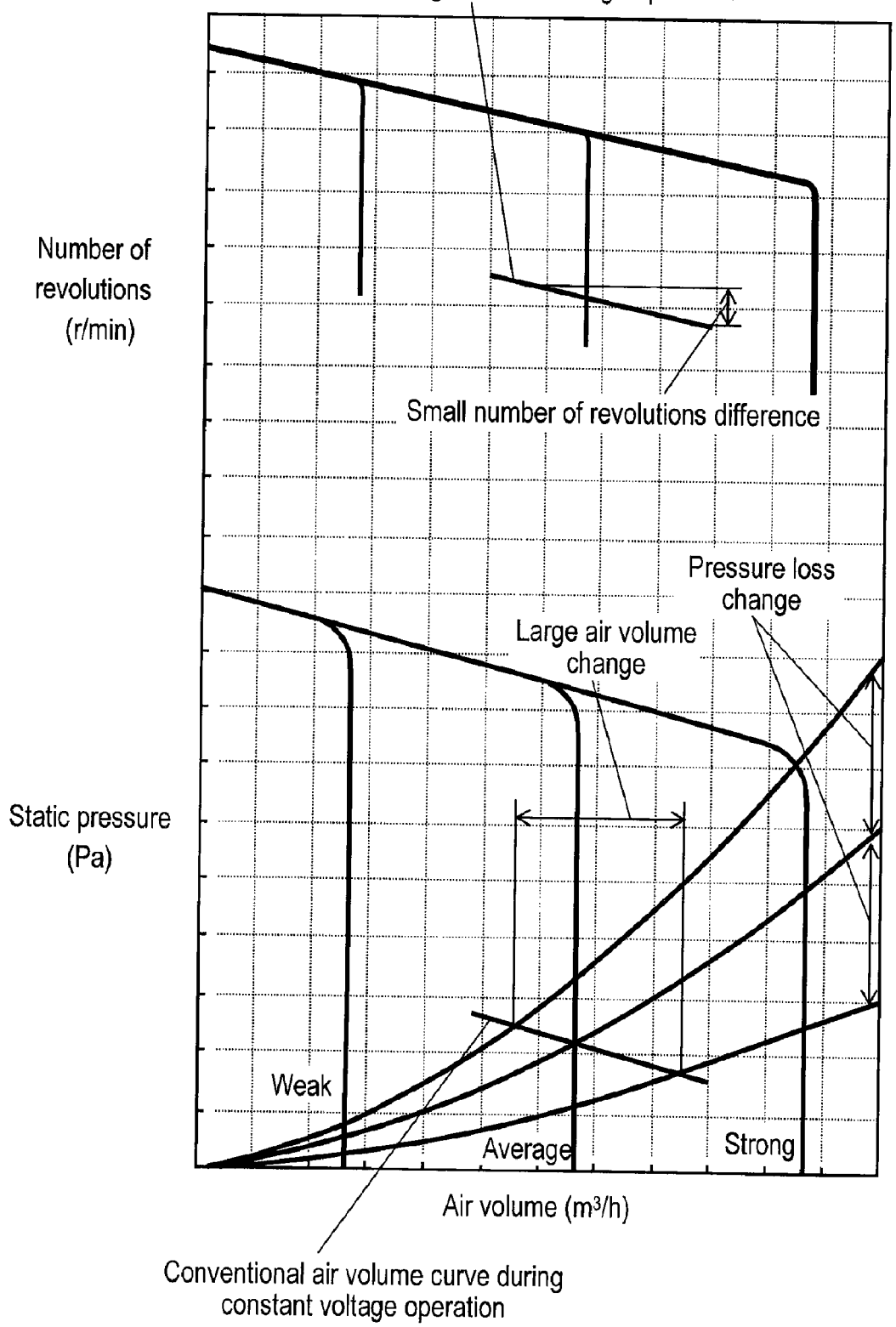

BLOWER AND ELECTRIC DEVICE WITH SUCH BLOWER MOUNTED THEREON

This Application is a U.S. National Phase Application of PCT International Application PCT/JP2006/319468.

TECHNICAL FIELD

The present invention relates to a blower mounted on a ventilator, an air conditioning apparatus, etc., and an electric device with the blower mounted thereon.

BACKGROUND ART

Conventional blowers disclosed in Japanese Patent Unexamined Publication No. 2002-165477 and Japanese Patent Unexamined Publication No. H10-89674 will be described with reference to FIGS. 6 to 9.

FIG. 6 shows a circuit of conventional brushless DC motor 104 (hereinafter referred to as a motor 104). A direct-current voltage that is obtained by rectifying alternating-current voltage 101 is applied to motor 104 via inverter 105. The above circuit also has current detector 106, position sensor 107 of a rotor, and control device 110. Control device 110 has number of revolutions detecting unit 111, current detecting unit 112, air-volume calculating unit 113, and speed control unit 114 as shown.

FIG. 7 shows a circuit of speed control unit 114. Air-volume calculating unit 113 calculates the target number of revolutions of motor 104 for attaining a target air volume. Speed control unit 114 generates a PWM signal that has an output voltage for attaining a target number of revolutions. Inverter 105 performs PWM driving of motor 104.

When motor 104 is driven with a constant voltage, as shown in FIG. 8, air volume changes greatly with little change in number of revolutions. Accordingly, if a pressure loss changes slightly under the influence of external wind pressure, etc., the air volume will change greatly. The present invention provides a blower that realizes constant air volume control even when a pressure loss changes.

DISCLOSURE OF THE INVENTION

A blower of the invention includes: a fan; an air volume specifying circuit of the fan; a brushless DC motor that drives the fan; an inverter circuit of the brushless DC motor; a driving logic control circuit for the brushless DC motor; a number of revolutions detecting circuit of the brushless DC motor; a low-voltage direct-current power source that applies a low-voltage direct-current voltage to the inverter circuit; a supply current control circuit that controls an average current supplied to the inverter circuit; and a current specifying circuit that specifies the average current. The number of revolutions of the brushless DC motor is controlled by the current specifying circuit to control the air volume of the fan constantly.

BRIEF DESCRIPTION OF THE DRAWINGS

FIG. 9 is a view showing an example of characteristics of the fan shown in FIG. 6.

REFERENCE NUMERALS

Figure 1:
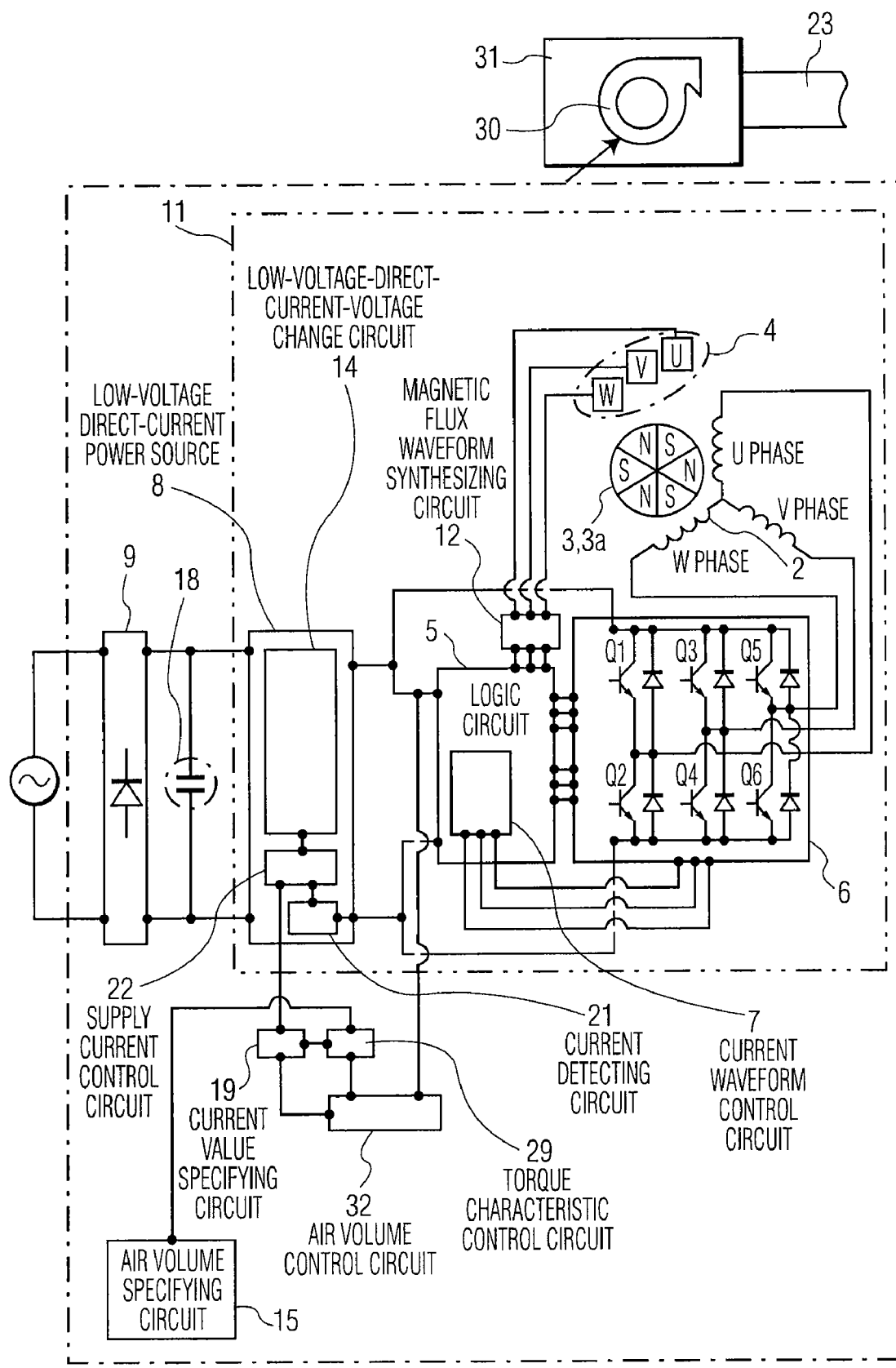
FIG. 1 is a view showing a configuration of a ventilator of an embodiment of the present invention.

2: DRIVE COIL
3: MAGNET ROTOR
4: HALL ELEMENT
5: DRIVING LOGIC CONTROL CIRCUIT
6: INVERTER CIRCUIT
8: LOW-VOLTAGE DIRECT-CURRENT POWER SOURCE
9: RECTIFYING CIRCUIT
11: BRUSHLESS DC MOTOR
14: LOW-VOLTAGE DIRECT-CURRENT-VOLTAGE CHANGE CIRCUIT
15: AIR VOLUME SPECIFYING CIRCUIT
19: CURRENT SPECIFYING CIRCUIT
21: CURRENT DETECTING CIRCUIT
22: SUPPLY CURRENT CONTROL CIRCUIT
29: TORQUE CHARACTERISTIC CONTROL CIRCUIT
30: FAN
31: VENTILATOR (ELECTRIC DEVICE) WITH A BLOWER MOUNTED THEREON
32: AIR VOLUME CONTROL CIRCUIT

PREFERRED EMBODIMENTS FOR CARRYING OUT THE INVENTION

Hereinafter, embodiments of the invention will be described with reference to the drawings.

As shown in FIGS. 1 to 4, ventilator 31 (electric device) mounted with a blower has fan 30 mounted with brushless DC motor 11 (hereinafter referred to as motor 11) built therein, and discharges indoor air to the outdoors via duct 23. Motor 11 contains drive coil 2, magnet rotor 3, and hall element 4 for detecting a magnetic pole, magnetic flux waveform synthesizing circuit 12 that synthesizes the output waveform of hall element 4, inverter circuit 6, logic circuit 5, current waveform control circuit 7, low-voltage direct-current power source 8 that converts a commercial alternating-current power source into a direct-current voltage of 45 V or less, current detecting circuit 21 that detects the current of inverter circuit 6, and supply current control circuit 22 that changes the output voltage of low-voltage direct-current power source 8 so that the average current of inverter circuit 6 may have a specified value.

Current detecting circuit 21 uses a shunt regulator for a reference voltage, and trims a current setting resistance to enhance detection precision. The above circuit is constituted by a hybrid IC except for some components. From motor 11, a pulse signal generated in a pulse signal circuit and the output voltage of low-voltage direct-current power source 8 are output to the outside.

A high-voltage direct-current voltage that is obtained by rectifying and smoothing a commercial alternating-current power, and a current-specifying voltage that specifies an average current to be controlled by supply current control circuit 22 are input to motor 11. At an outside of motor 11, rectifying circuit 9 that rectifies commercial alternating-current power, smoothing capacitor 18, current specifying circuit 19 that specifies an average current value controlled by supply current control circuit 22, and air volume specifying circuit 15 that specifies the air volume of fan 30 are arranged.

When a power source is turned on, a certain current is supplied to inverter circuit 6, and magnet rotor 3 rotates. Since the magnetic pole of magnet rotor 3 is constituted by polar anisotropic magnets 3a, both the induced voltage of drive coil 2 and the detected waveform of hall element 4 are substantially sinusoidal waveforms. Magnetic flux waveform synthesizing circuit 12 subtracts a V-phase waveform from a U-phase waveform of hall element 4 in order to remove a harmonic component of a U-phase current, subtracts a W-phase waveform from the V-phase waveform of hall element 4 in order to remove a harmonic component of a V-phase current, and subtracts the U-phase waveform from the W-phase waveform of hall element 4 in order to remove a harmonic component of the W-phase current.

Current waveform control circuit 7 uses switching elements Q1 to Q6 of inverter circuit 6 in a non-saturated state close to saturation so that each waveform becomes substantially analogous to a waveform from which the harmonic component made by magnetic flux distribution synthesizing circuit 12 is removed. Accordingly, there is no steep change in the current of inverter circuit 6, and generation of ripples is also suppressed. Supply current control circuit 22 always controls low-voltage direct-current-voltage change circuit 14 so that the average current of inverter circuit 6 becomes equal to specification of current specifying circuit 19.

Figure 2:
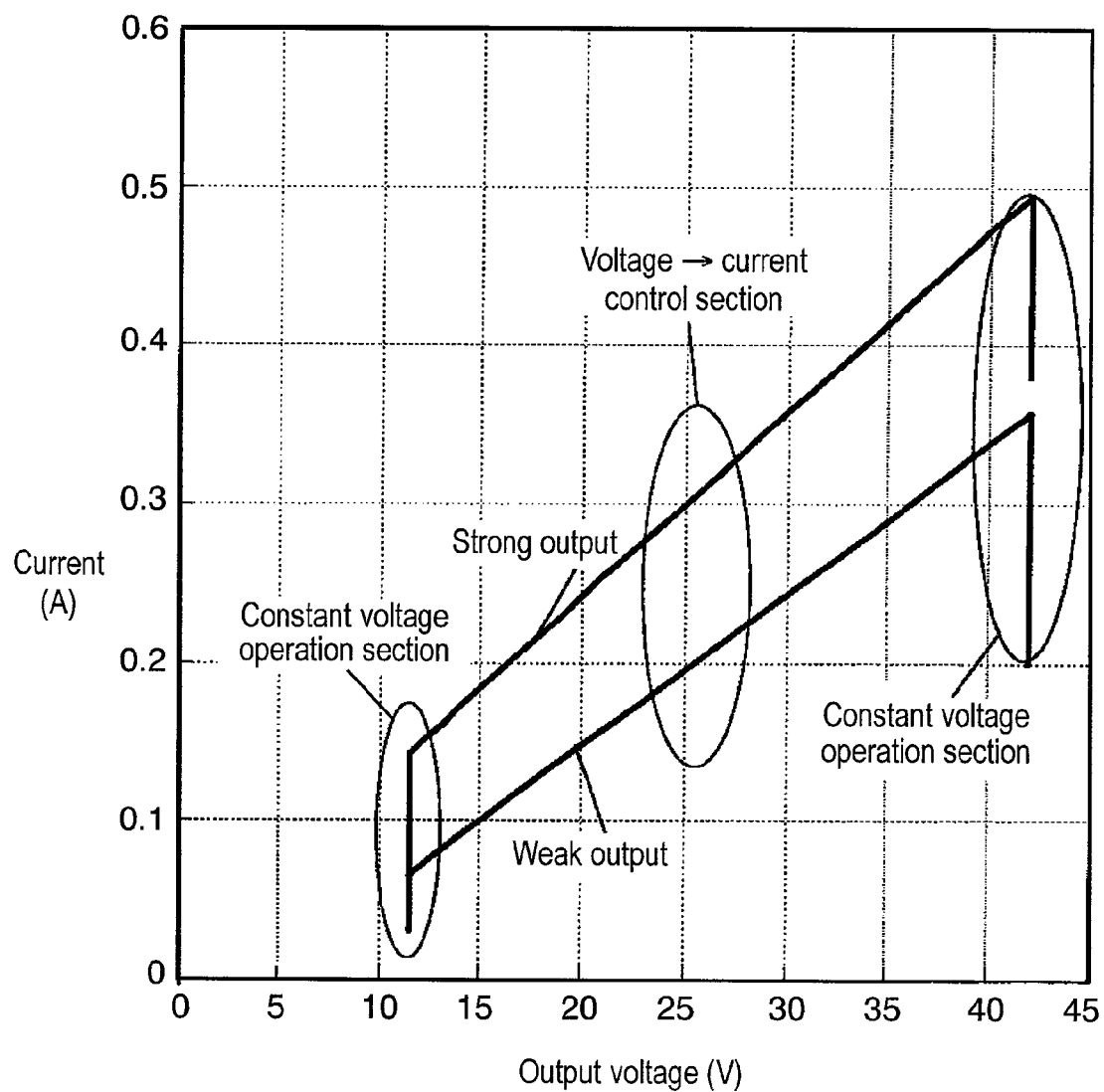
FIG. 2 is a view showing characteristics of a motor mounted on the ventilator shown in FIG. 1.

Air volume control circuit 32 controls current value specifying circuit 19 so that the output voltage and current characteristic of low-voltage direct-current power source 8 becomes the characteristic shown in FIG. 2.

Torque characteristic control circuit 29 controls current value specifying circuit 19 so as to realize the number of revolutions and torque characteristic of motor 11 corresponding to a plurality of air volumes specified by air volume specifying circuit 15.

Figure 3:
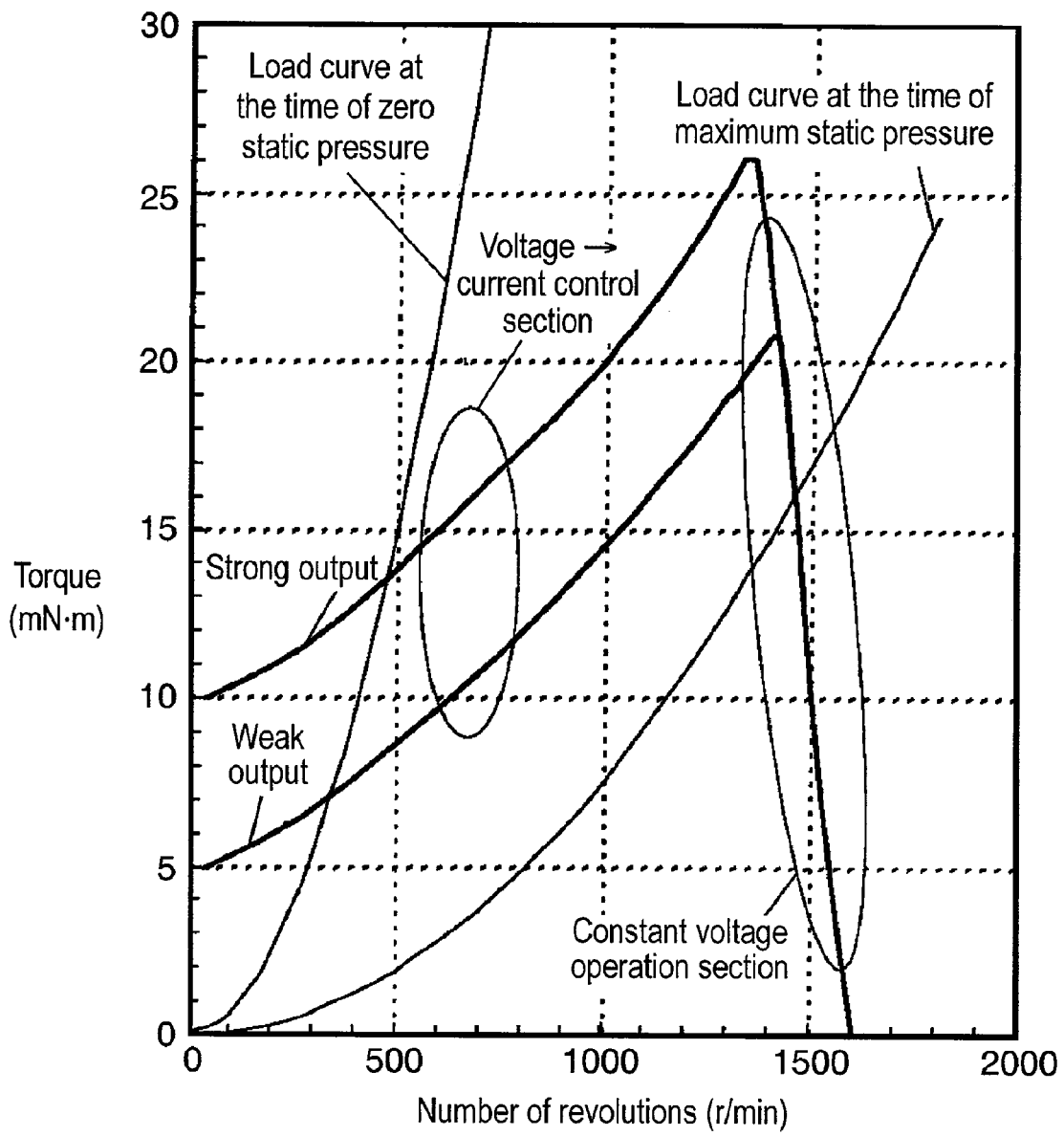
FIG. 3 is a view showing characteristics of a motor mounted on the ventilator shown in FIG. 1.
Figure 4:
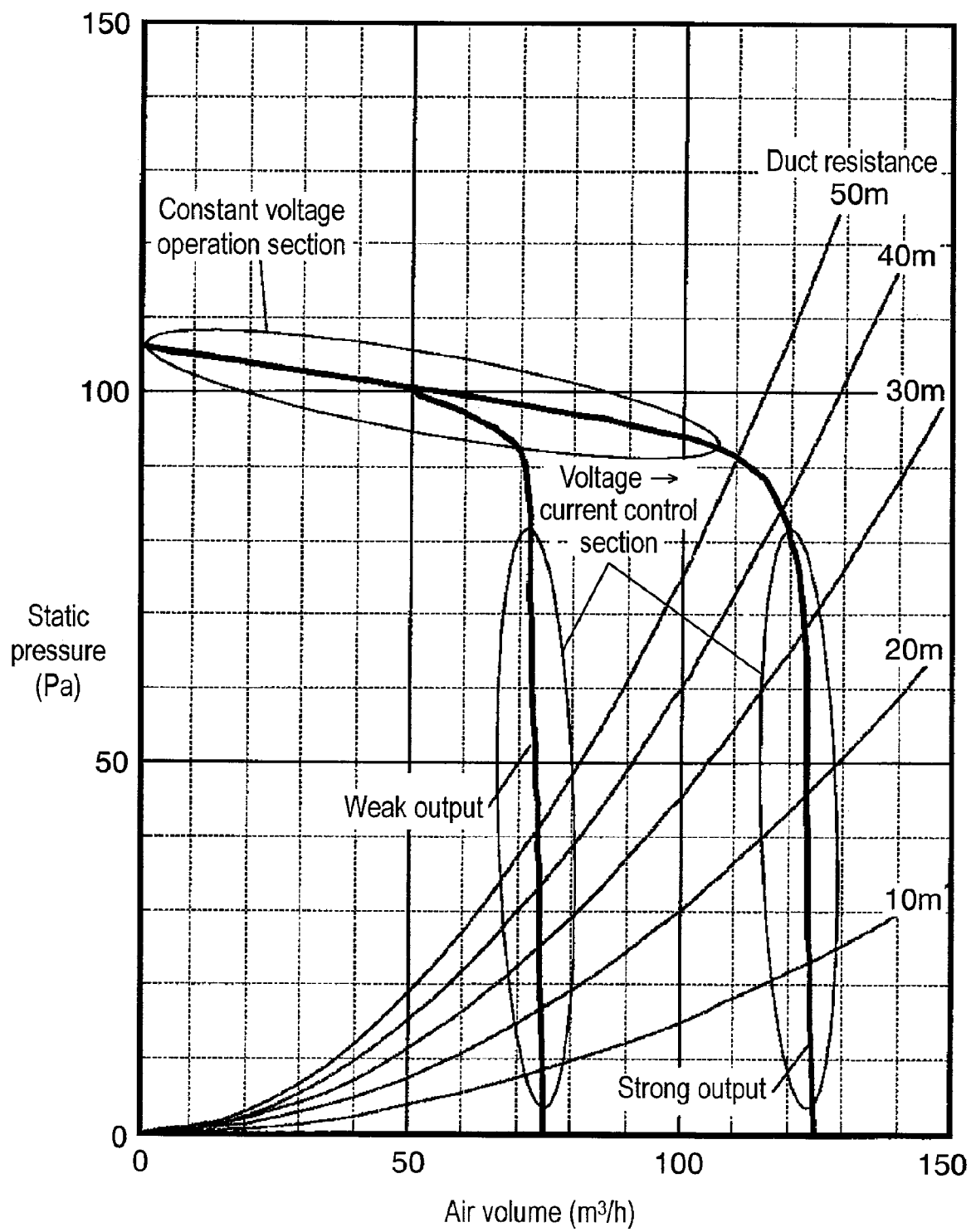
FIG. 4 is a view showing an example of characteristics of the ventilator shown in FIG. 1.
Figure 5:
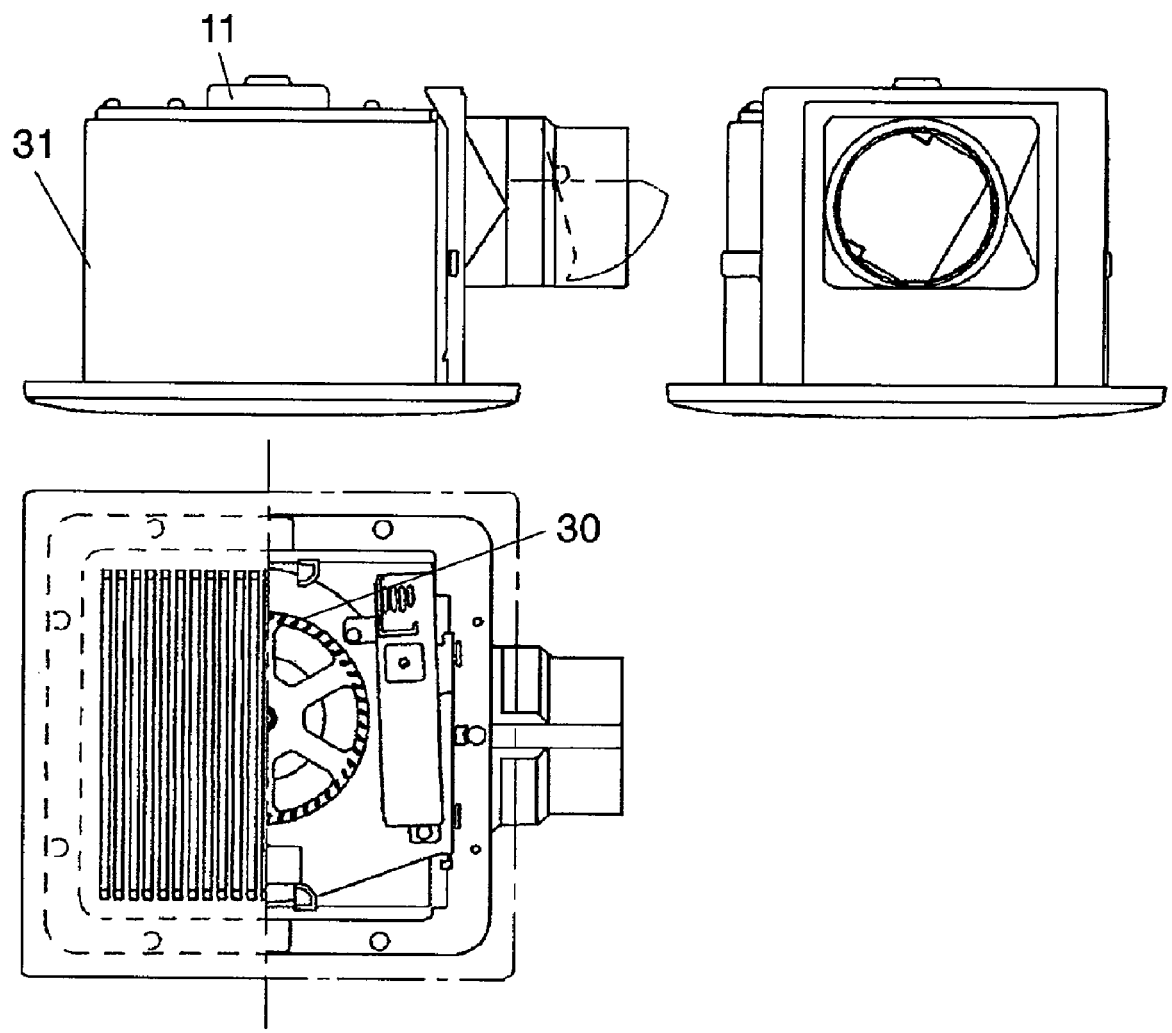
FIG. 5 is an appearance view of the ventilator shown in FIG. 1.
Figure 6:
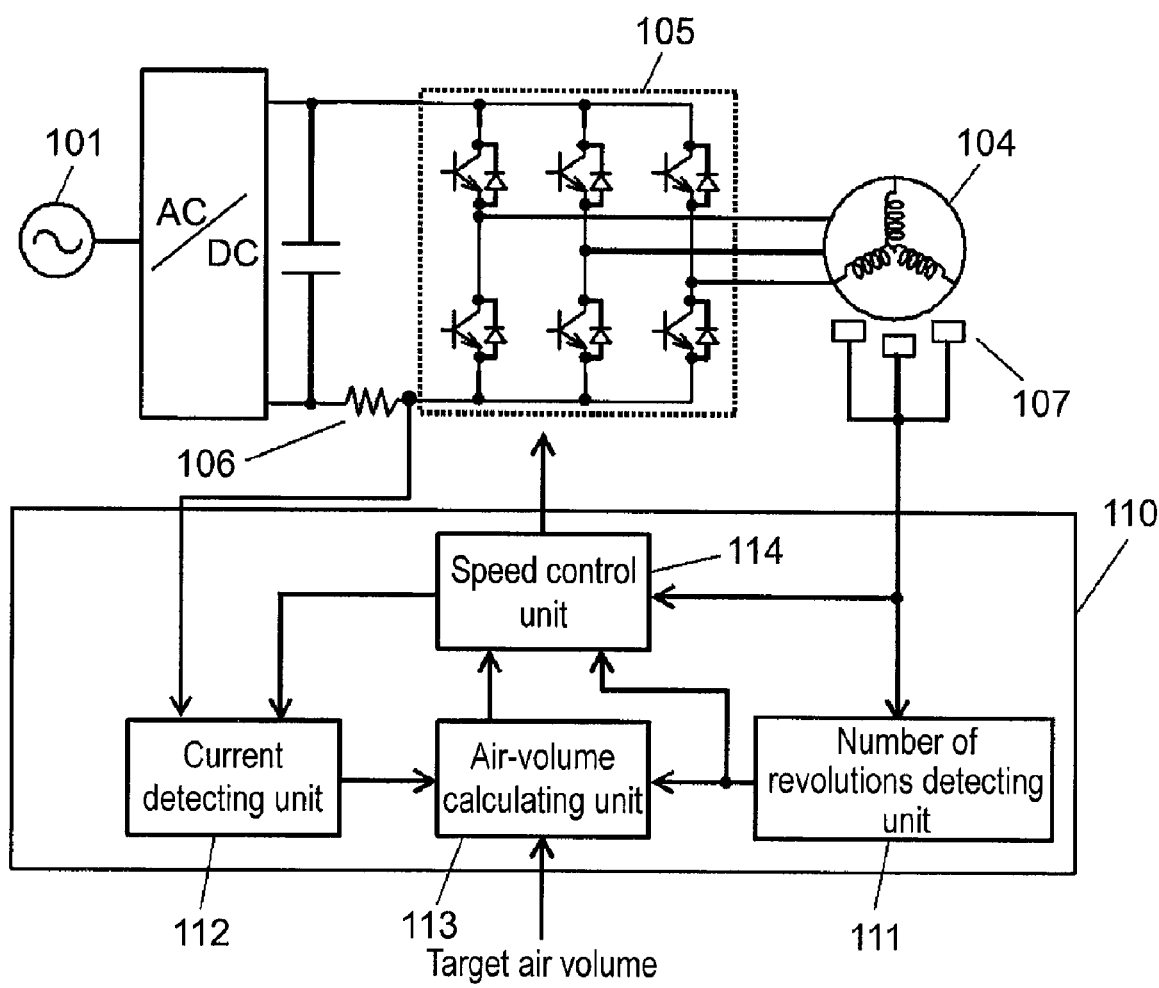
FIG. 6 is a circuit block diagram showing a conventional blower.
Figure 7:
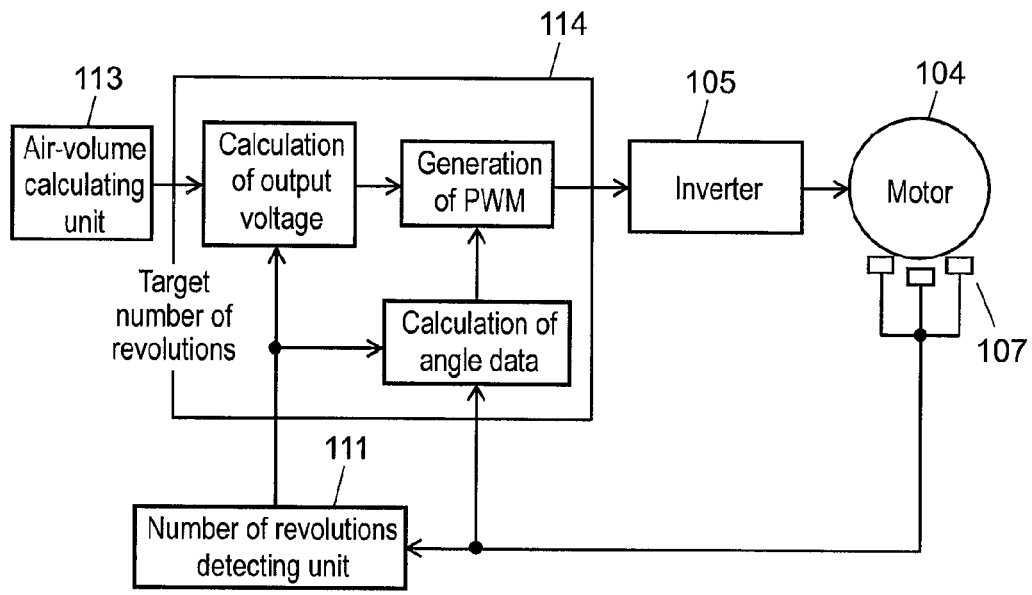
FIG. 7 is a view showing a circuit configuration of the fan shown in FIG. 6.
Figure 8:
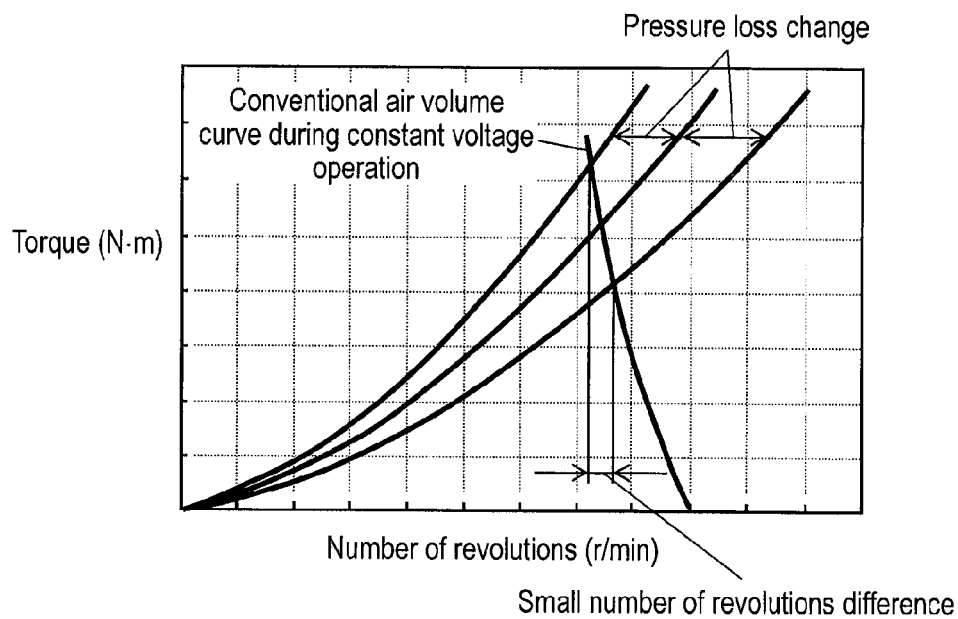
FIG. 8 is a view showing characteristics of a motor mounted on the fan shown in FIG. 6.

As described above, since air volume control circuit 32 controls the current of inverter circuit 6 so as to become high as the number of revolutions of fan 30 becomes high, as shown in FIG. 3, the number of revolutions and torque characteristic of the motor becomes a characteristic that the torque become large as the number of revolutions rises. Even when a pressure loss, such as external wind pressure or duct length, changes, air volume can be controlled constantly by virtue of this characteristic.

In addition, in the present embodiment, the output voltage of low-voltage direct-current power source 8 is changed to control the current of inverter circuit 6 constantly. However, the duty of PWM may be changed by fixing a direct-current voltage, and performing PWM control of a motor current. Even in this case, a difference is not caused in the operation effect that constant air volume control can be realized.

Specifically, a PWM control circuit (not shown) that performs PWM control of a low-voltage direct-current voltage of low-voltage direct-current power source 8, and a duty specifying circuit (not shown) that specifies a duty in the PWM control circuit are included. Also, a constant (fixed) low-voltage direct current is applied to inverter circuit 6 from low-voltage direct-current power source 8. In order to obtain an air volume specified by air volume specifying circuit 15, it is possible to configure air volume control circuit 32 so that the value of an average current specified by current specifying circuit 19 is changed according to specification of the duty specifying circuit instead of the voltage value of low-voltage direct-current power source 8.

In addition, in the present embodiment, switching elements Q1 to Q6 of inverter circuit 6 are used in a non-saturated state close to saturation, it is possible to adopt a configuration in which each phase current waveform is controlled by performing PWM control (chopping) of Q1, Q3, and Q5 or Q2, Q4, and Q6. Even in this case, a difference is not caused in the operation effect that constant air volume control can be realized.

In addition, when logic circuit 5 sets the conduction angle of the coil of motor 11 to 150 degrees or more and 180 degrees or less, a steep change will not occur in a motor current.

INDUSTRIAL APPLICABILITY

Since the blower of the present invention can obtain the characteristics of constant air volume without being influenced by a pressure loss, the fan is suitable for mounting onto a ventilator, an air conditioning apparatus, etc.

The invention claimed is:

1. A blower comprising:
a fan;
an air volume specifying circuit of the fan;
a brushless DC motor that drives the fan;
an inverter circuit of the brushless DC motor;
a driving logic control circuit that performs driving control of the brushless DC motor;
a low-voltage direct-current power source that applies a low-voltage direct-current voltage to the inverter circuit;
a supply current control circuit that controls an average current supplied to the inverter circuit constantly;
a current specifying circuit that specifies the average current; and
an air volume control circuit that changes the value of the average current specified by the current specifying circuit according to the voltage value of the low-voltage direct-current power source in order to obtain an air volume specified by the air volume specifying circuit.

2. The blower of claim 1, further comprising:
a PWM control circuit that performs PWM control of a low-voltage direct-current voltage of the low-voltage direct-current power source; and
a duty specifying circuit that specifies a duty to the PWM control circuit,
wherein the constant low-voltage direct-current voltage is applied from the low-voltage direct-current power source to the inverter circuit; and
an air volume control circuit that changes the value of the average current specified by the current specifying circuit according to specification of the duty specifying circuit instead of the voltage value of the low-voltage direct-current power source in order to obtain an air volume specified by the air volume specifying circuit.

3. The blower of claim 1, further comprising:
a torque characteristic control circuit that controls the current specifying circuit in order to obtain a specified air volume.

4. The blower of claim 1,
wherein the brushless DC motor has a magnet rotor of a polar anisotropic magnet, and the driving logic control circuit sets a conduction angle of an voltage to be applied to the brushless DC motor to 150 degrees or more and 180 degrees or less.

5. An electric device comprising:
the blower of claim 1 mounted thereon.

6. The blower of claim 2, further comprising:
a torque characteristic control circuit that controls the current specifying circuit in order to obtain a specified air volume.

7. The blower of claim 2,
wherein the brushless DC motor has a magnet rotor of a polar anisotropic magnet, and the driving logic control circuit sets a conduction angle of an voltage to be applied to the brushless DC motor to 150 degrees or more and 180 degrees or less.

8. An electric device comprising:
the blower of claim 2 mounted thereon.

* * * * *